(12) United States Patent
Nomura et al.

(10) Patent No.: US 11,483,158 B2
(45) Date of Patent: Oct. 25, 2022

(54) DISTRIBUTED LEDGER DEVICE, DISTRIBUTED LEDGER SYSTEM, AND DISTRIBUTED LEDGER MANAGEMENT METHOD

(71) Applicant: Hitachi, Ltd., Tokyo (JP)

(72) Inventors: Shimpei Nomura, Tokyo (JP); Mitsuo Hayasaka, Tokyo (JP); Jun Nemoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 229 days.

(21) Appl. No.: 16/811,044

(22) Filed: Mar. 6, 2020

(65) Prior Publication Data

US 2020/0322165 A1    Oct. 8, 2020

(30) Foreign Application Priority Data

Apr. 3, 2019  (JP) .............................. JP2019-071362

(51) Int. Cl.
| H04L 9/32 | (2006.01) |
| H04L 9/06 | (2006.01) |
| G06F 9/46 | (2006.01) |
| G06F 11/14 | (2006.01) |
| H04L 9/08 | (2006.01) |
| H04L 9/00 | (2022.01) |

(52) U.S. Cl.
CPC ............ *H04L 9/3247* (2013.01); *G06F 9/466* (2013.01); *G06F 11/1448* (2013.01); *H04L 9/0643* (2013.01); *H04L 9/085* (2013.01); *H04L 9/50* (2022.05)

(58) Field of Classification Search
None
See application file for complete search history.

(56) References Cited

U.S. PATENT DOCUMENTS

2019/0207770 A1* 7/2019 Zhou ..................... H04L 9/0637
2019/0354966 A1* 11/2019 Himura ................ G06Q 20/401
2020/0213117 A1* 7/2020 Resch ................... H04L 9/3247

FOREIGN PATENT DOCUMENTS

| JP | 2019-028525 A | 2/2019 | |
| JP | 2019028525 A | * 2/2019 | .............. G06F 9/46 |
| WO | WO-2018105038 A1 | * 6/2018 | .............. H04L 9/32 |
| WO | WO-2019217428 A1 | * 11/2019 | .......... H04W 12/106 |

* cited by examiner

*Primary Examiner* — Wasika Nipa
*Assistant Examiner* — Mayasa A. Shaawat
(74) *Attorney, Agent, or Firm* — Volpe Koenig

(57) ABSTRACT

Provided is a distributed ledger device, aiming at easily and appropriately determining a status of operational processing on a distributed ledger in a certain distributed ledger device at another distributed ledger device. A BC node in a BC system including a plurality of BC nodes that manage a distributed ledger for a predetermined target transaction, the BC node including: the storage device; and the processor, in which the storage device stores the distributed ledger, and the processor, when executing processing relating to the distributed ledger, transmits content information indicating contents of the processing to be managed by another BC node that manages the distributed ledger. The processor may transmit an instruction to register the content information in another distributed ledger managed by the plurality of BC nodes that manage the distributed ledger.

9 Claims, 18 Drawing Sheets

SMART CONTRACT MANAGEMENT TABLE 800

| ID | TYPE | EXECUTION PROGRAM |
|---|---|---|
| 0 | BUSINESS | /XXX/XXX/XXX |
| ⋮ | | |
| 100 | OPERATION | /XXX/XXX/XXX |
| ⋮ | | |

FIG. 7
SYSTEM CONFIGURATION MANAGEMENT TABLE 900

| ORGANIZATION ID /901 | NODE ID /902 | PUBLIC KEY /903 |
|---|---|---|
| 0 | 0 | XXXXXXXXX |
|   | 1 | XXXXXXXXX |
| ⋮ | | |

FIG. 8
PERIPHERAL COMPONENT MANAGEMENT TABLE 1000

| ORGANIZATION ID (1001) | COMPONENT ID (1002) | TYPE (1003) | PUBLIC KEY (1004) |
|---|---|---|---|
| 0 | 0 | STORAGE | XXXXXXXXXX |
|   | ⋮ | | |
| 1 | 0 | STORAGE | XXXXXXXXXX |
|   | ⋮ | | |
| ⋮ | | | |

FIG. 9

OPERATIONAL PROCESSING STEP MANAGEMENT TABLE 1100

| SC ID 1101 | ORGANIZATION ID 1102 | NODE ID 1103 | STEP ID 1104 | EXECUTION PROGRAM 1105 | LOG REGISTRATION NECESSITY 1106 | LOG FORMAT 1107 | COOPERATION DESTINATION ID 1108 | COOPERATION DESTINATION LOG ACQUISITION 1109 | SIGNATURE ISSUER 1110 |
|---|---|---|---|---|---|---|---|---|---|
| 0 | - | - | 1 | xxx-x.xx | NECESSARY | ("%s: %s", status, text) | - | - | BC NODE |
|  |  |  | 2 | xxx-x.xx | NECESSARY | ("%s: %s", status, text) | 0: | ON: | COOPERATION DESTINATION: |
| ... |  |  |  |  |  |  |  |  |  |

FIG. 10

OPERATIONAL PROCESSING STEP TRANSITION MANAGEMENT TABLE 1200

| SC ID | ORGANIZATION ID | NODE ID | STEP ID | TRANSITION CONDITION | NEXT STEP ID | REGISTRATION STATE |
|---|---|---|---|---|---|---|
| 0 | - | - | 1 | COMMAND SUCCESS | 2 | DURING EXECUTION |
|   |   |   |   | COMMAND FAILURE | - | ABNORMAL TERMINATION |
|   |   |   | 2 | COMMAND SUCCESS | - | EXECUTION COMPLETION |
|   |   |   |   | COMMAND FAILURE | - | ABNORMAL TERMINATION |
| ⋮ | | | | | | |

FIG. 11

OPERATIONAL TRANSACTION MANAGEMENT TABLE 1300

| ID ⸝1301 | SC ID ⸝1302 | STATE ⸝1303 | PARAMETER ⸝1304 | ISSUER ⸝1305 | REGISTRATION TIME STAMP ⸝1306 | FINAL UPDATE TIME STAMP ⸝1307 |
|---|---|---|---|---|---|---|
| 0 | 0 | EXECUTION COMPLETION | -x XXX | user0 | XXXXXXXXXX | XXXXXXXXX |
| 1 | 0 | DURING EXECUTION | -y YYY | user2 | XXXXXXXXXX | XXXXXXXXX |
| ... | | | | | | |

FIG. 12

OPERATIONAL LOG TABLE 1400

| Tx ID 1401 | ORGANIZATION ID 1402 | NODE ID 1403 | STATE 1404 | TIME STAMP 1405 | COMPLETION STEP ID 1406 | LOG 1407 | SIGNATURE 1408 | NEXT STEP ID 1409 |
|---|---|---|---|---|---|---|---|---|
| 0 | 0 | 0 | EXECUTION COMPLETION | XXXXXXXXX | 1 | xxxxxxxx | XXXXX | 2 |
|  |  |  |  | XXXXXXXXX | 2 | xxxxxxxx | XXXXX | - |
| ... |  |  |  |  |  |  |  |  |

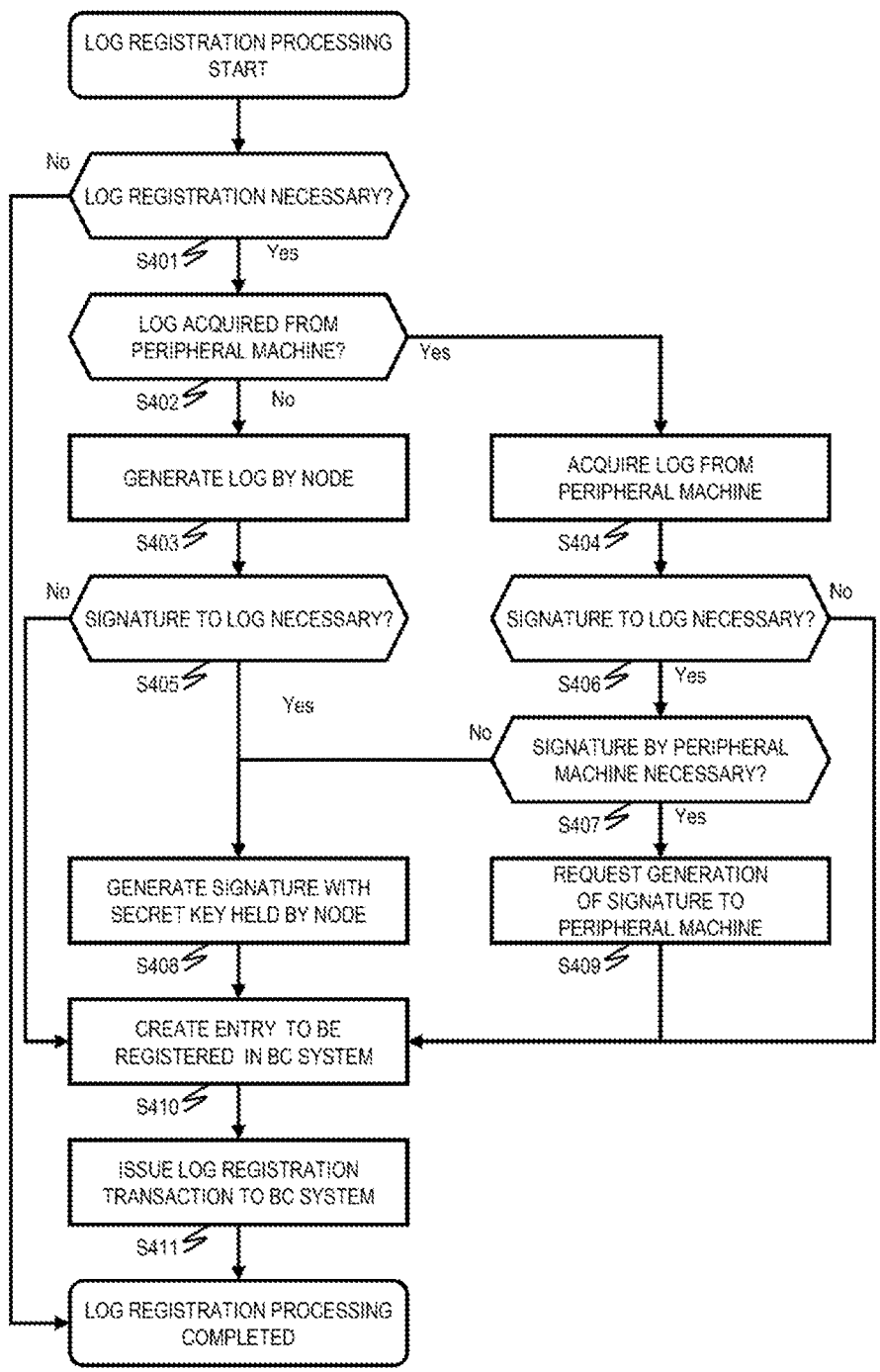

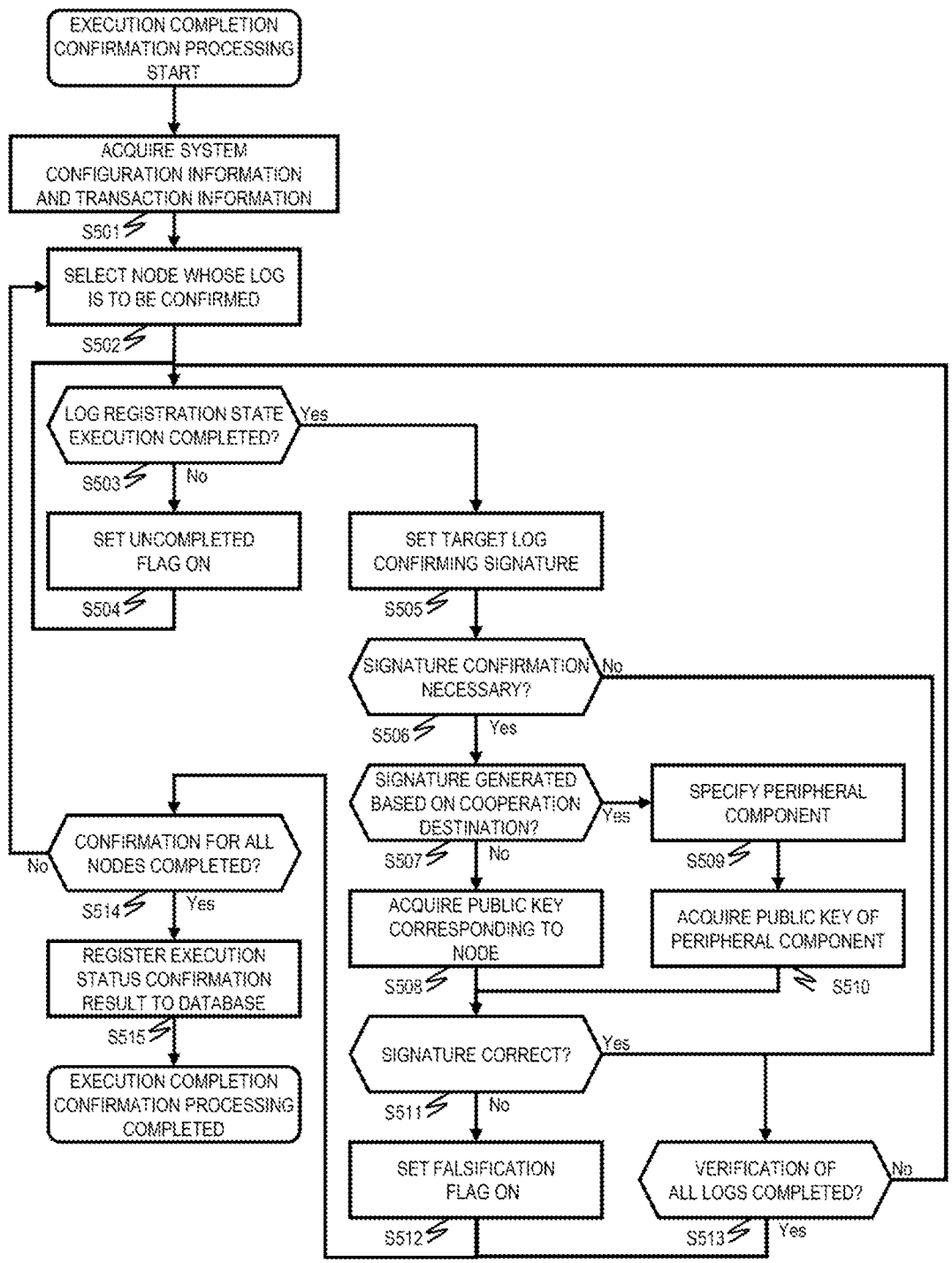

DISTRIBUTED LEDGER DEVICE, DISTRIBUTED LEDGER SYSTEM, AND DISTRIBUTED LEDGER MANAGEMENT METHOD

BACKGROUND OF THE INVENTION

1. Field of the Invention

The present invention relates to a technique of managing a distributed ledger.

2. Description of the Related Art

A Block Chain (BC) is a technique for implementing a distributed system shared among a plurality of subjects. In the BC system, only transactions that have agreed upon between the subjects are received, data generated and updated by the transactions are duplicated and held between the subjects, and a history of the transactions is stored in a data structure called a block chain which is difficult to be falsified. According to the application of the BC technique, since a user may construct a system that allows transactions and data sharing among users without an intervention of a central collecting authority, it is expected to speed up the transactions and reduce costs, and to be used in many fields such as finance and industry.

In the BC system, in order for each participating subject to provide a node (a distributed ledger device) that constitutes a system, administrators differ depending on the node. Therefore, in a system shared among a plurality of subjects, it is difficult to manage a data retention status of the entire system. For example, in a case where data backup is performed from a node that participates in the system, since an administrator implements backup for each participating node, it is difficult to delete personal information from all backup data. In recent years, since a legal system gives the user the right to request that personal information be deleted from the system, a mechanism that can reliably execute data deletion is necessary in the BC system.

JP-A-2019-28525 (Patent Literature 1) discloses a technique of implementing operational processing by aligning policy and timing among participating nodes of a BC system. According to the technique disclosed in Patent Literature 1, operational operation is handled as a transaction of the BC system, so that operation can be executed at a unified policy or timing while an agreement is formed between nodes.

For example, by applying the technique disclosed in Patent Literature 1 to data deletion processing, it is possible to request implementation of data deletion at nodes managed by a plurality of subjects at the same timing. However, in the technique in Patent Literature 1, although it is possible to request data deletion to the participating nodes of the BC system with unified policy, it is difficult, for example, to determine at the participating nodes that whether all backup data has been securely deleted at another node. It is difficult for another node to confirm the processing performed individually by the participating nodes, not limited to the data deletion processing.

SUMMARY OF THE INVENTION

The prevent invention has been made in view of the above circumstances, and an object thereof is to provide a technique capable of easily and appropriately confirming status of operational processing on a distributed ledger in a certain distributed ledger device at another distributed ledger device.

In order to achieve the above object, a distributed ledger device according to one aspect is a distributed ledger device in a distributed ledger system including a plurality of distributed ledger devices that manage a first distributed ledger for a predetermined target transaction, the distributed ledger device including: a storage device; and a processor unit, in which the storage device stores the first distributed ledger, and the processor unit, when executing processing relating to the first distributed ledger, transmits content information indicating contents of the processing to be managed by another distributed ledger device that manages the first distributed ledger.

According to the invention, it is possible to easily and appropriately confirm a status of operational processing on a distributed ledger in a certain distributed ledger device at another distributed ledger device.

BRIEF DESCRIPTION OF THE DRAWINGS

FIG. 7 is a configuration diagram of a system configuration management table according to the embodiment;
FIG. 8 is a configuration diagram of a peripheral component management table according to the embodiment;
FIG. 9 is a configuration diagram of an operational processing step management table according to the embodiment;
FIG. 10 is a configuration diagram of an operational processing step transition management table according to the embodiment;
FIG. 11 is a configuration diagram of an operational transaction management table according to the embodiment;
FIG. 12 is a configuration diagram of an operational log table according to the embodiment;
FIG. 17 is a flowchart of log registration processing according to the embodiment;
and
FIG. 18 is a flowchart of processing performed by the operational SC program corresponding to operational processing execution completion confirmation request according to the embodiment.

DESCRIPTION OF THE PREFERRED EMBODIMENTS

An embodiment will be described with reference to the drawings. The embodiment described below does not limit the invention according to the claims, and all of the elements and combinations thereof described in the embodiment are not necessarily essential to the solution to the problem.

Information may be described by an expression of "AAA table" in the following description. Alternatively, the information may be represented by any data structure. That is, the "AAA table" may be referred to as "AAA information" to indicate that the information does not depend on the data structure.

A "processor unit" includes one or more processors in the following description. Typically, at least one processor is a microprocessor such as a central processing unit (CPU). The one or more processors may be a single core processor or a multi-core processor. The processor may include a hardware circuit that performs a part or all of processing.

Processing may be described using a "program" as an operation subject in the following description. The program is executed by a processor unit to perform predetermined processing by appropriately using at least one of a storage unit and an interface unit. Therefore, a subject of the processing may be a processor unit (or a device or a system having a processor unit). The program may be installed on the computer from a program source. The program source may be, for example, a program distribution server or a storage medium readable by a computer. Two or more programs may be implemented as one program, or one program may be implemented as two or more programs in the following description.

First, an outline of an embodiment will be described.

Figure 1:
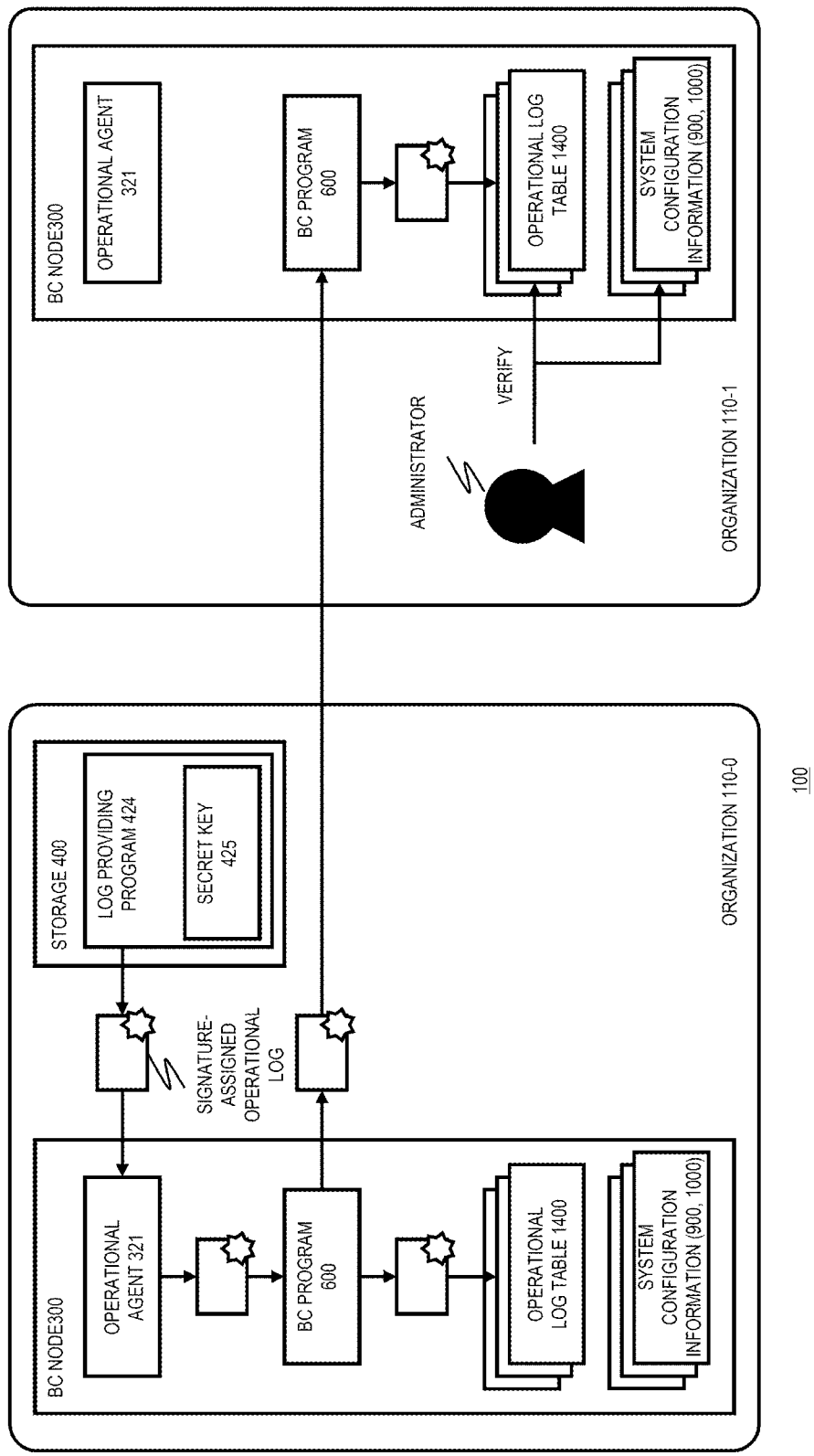
FIG. 1 shows an outline according to an embodiment.

FIG. 1 shows an outline according to the embodiment.

In a block chain system (a BC system) 100 which is an example of a distributed ledger system according to the present embodiment, a BC node 300 constituting the BC system 100, when operational processing including data deletion processing of deleting backup data of a distributed ledger is implemented, generates a log (an example of content information) for the operational processing, assigns a signature using a secret key 425 of a storage 400 (an example of a peripheral component) storing the backup data to the generated log, registers the log in the BC system 100, and stores the log.

The BC node 300 stores, as system configuration information, for example, a system configuration management table 900 (see FIG. 7) that manages configuration information of the BC system 100, and a peripheral component management table 1000 (see FIG. 8) that manages configuration information of the storage system 400 of the BC system 100. The BC node 300 stores an operational log table 1400 (see FIG. 12) that manages an operational log indicating a processing content of the operational processing. In the BC node 300, an operational agent 321 that executes the operational processing is operated. After executing operational processing involving the storage 400, the operational agent 321 acquires the operational log to which the signature is assigned with the secret key 425 from the storage 400. Next, the operational agent 321 duplicates the operational log via a BC program 600 and sends the operational log to all other BC nodes 300 to register and store the operational log in the operational log table 1400, and registers the operational log in the operational log table 1400 in the own BC node 300 as well.

BC System Configuration

Next, the block chain (BC) system according to the embodiment will be described in detail.

Figure 2:
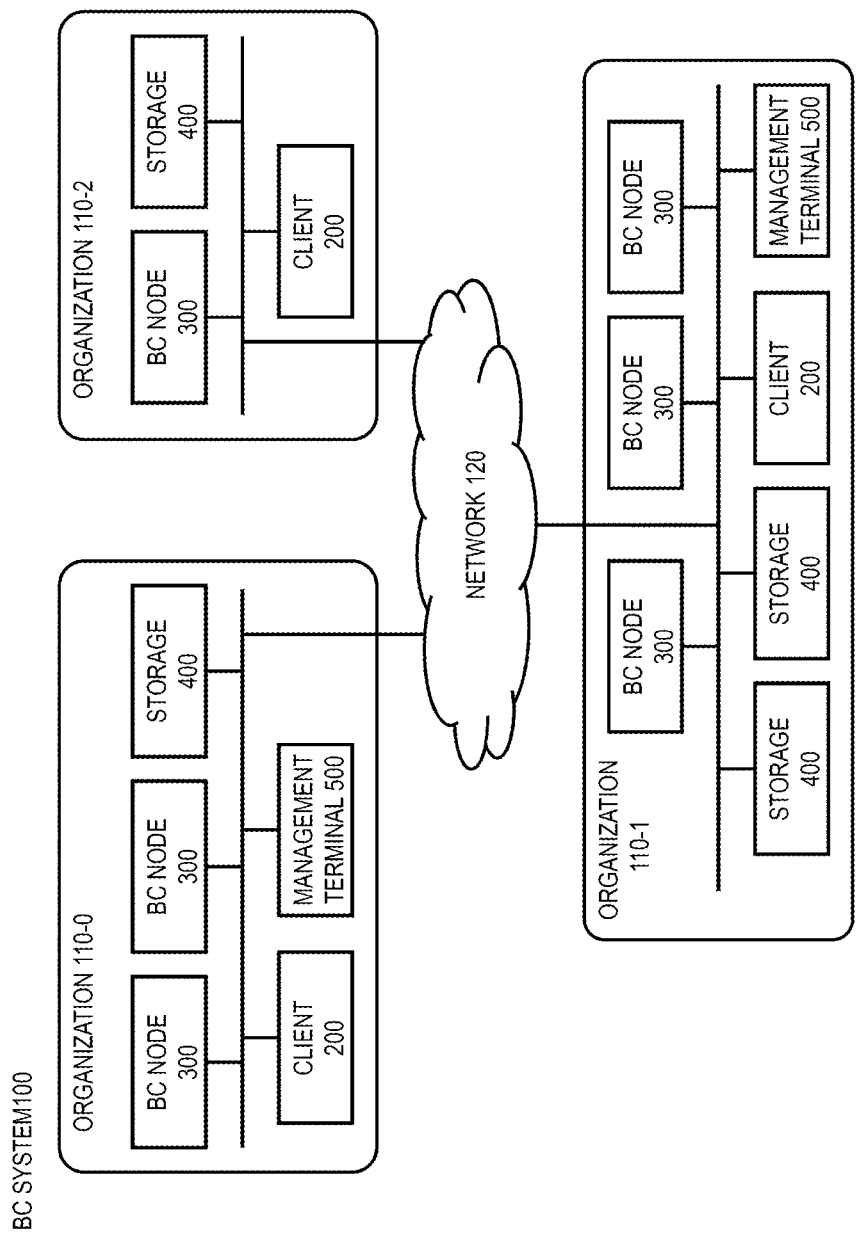
FIG. 2 is an overall configuration diagram of a block chain (BC) system according to the embodiment.

FIG. 2 is an overall configuration diagram of the block chain (BC) system according to the embodiment.

The BC system 100 includes one or more clients 200, the plurality of BC nodes 300, one or more storages 400, and one or more management terminals 500. The clients 200, the BC nodes 300, the storages 400, and the management terminals 500 are interconnected via a network 120 or the like. The network 120 can include a communication line including, for example, a wide area network (WAN), a local area network (LAN), the Internet.

In the BC system 100, for example, the clients 200, the BC nodes 300, the storages 400, and the management terminals 500 are distributed and managed by a plurality of organizations 110 (three organizations 110-0, 110-1, and 110-2 in the example in FIG. 2).

Client 200

The client 200 includes, for example, a computer including a processor, a memory, an input and output device, a network interface. In the client 200, a business application program or the like that utilizing a BC service for managing the transaction in the distributed ledger is executed. The client 200 generates a transaction by executing an application program by the processor, and issues the transaction to the BC node 300. The application program may be executed by the BC node 300, so that the BC node 300 may function as the client 200.

Management Terminal 500

The management terminal 500 includes, for example, a computer including a processor, a memory, an input and output device such as a keyboard and a display, and a network interface. In the management terminal 500, an operational management application program for managing the BC service is executed. The management terminal 500 receives an instruction to set the BC node 300 and the storage 400 from the administrator via the input and output device. The management terminal 500 displays information indicating states of the BC node 300 and the storage 400 via the input and output device. A computer including the client 200 or the BC node 300 may have functions of the management terminal 500.

BC Node 300

Figure 3:
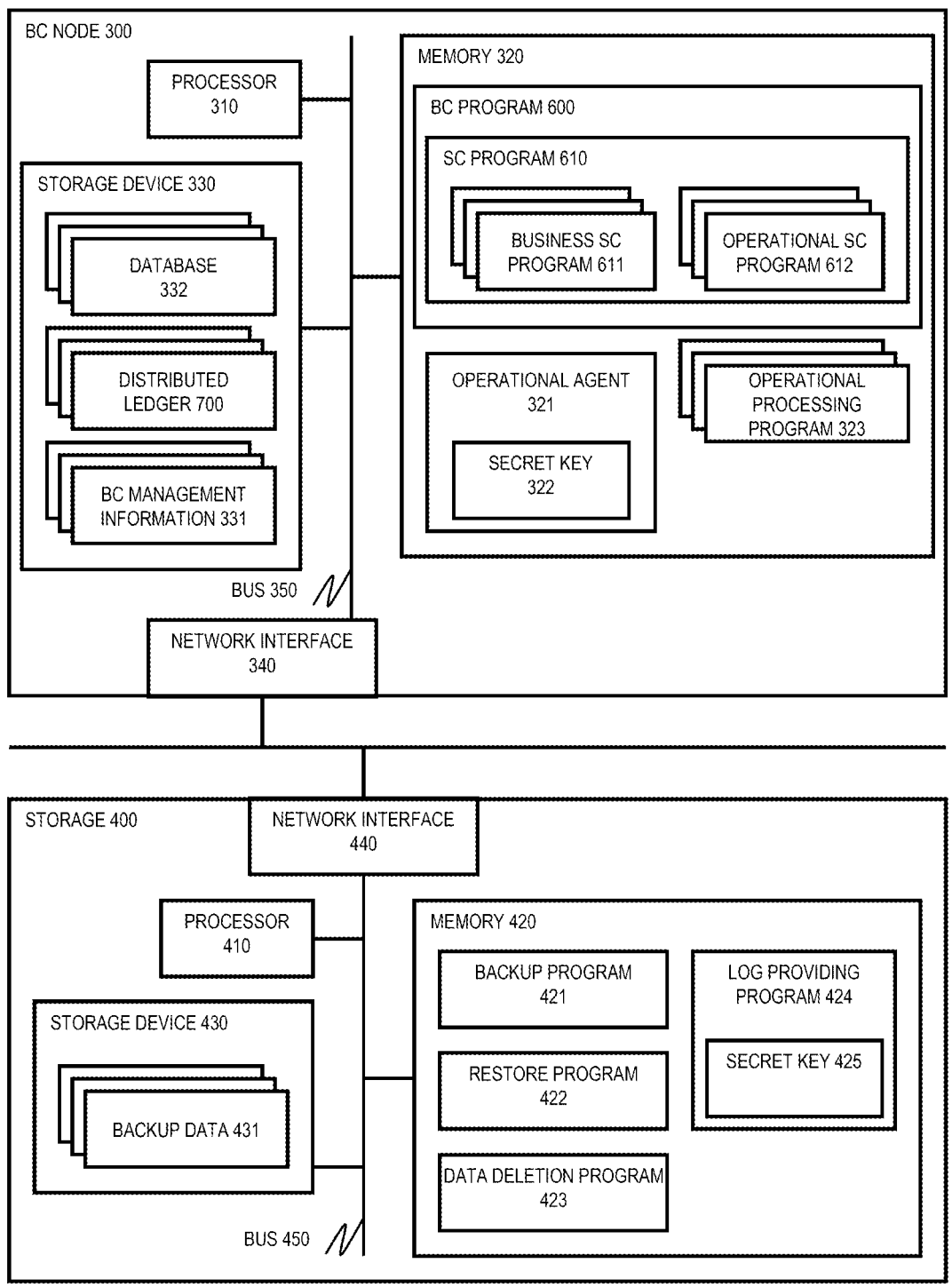
FIG. 3 is a configuration diagram of a BC node and a storage according to the embodiment.

FIG. 3 is a configuration diagram of the BC node and the storage according to the embodiment.

The BC node 300 is an example of the distributed ledger device, and is a computer that provides the BC service to the client 200. The BC node 300 includes a processor 310, a memory 320, a storage device 330, and a network interface 340. These constituent elements 310, 320, 330 and 340 are interconnected by a bus 350.

The processor 310 is an example of a processor unit, and is a calculation processing device including a central processing unit (CPU) and the like, and controls the operation of the BC node 300 in accordance with a program, a calculation parameter, and the like that are stored in the memory 320.

The network interface 340 is an interface such as a wired LAN card or a wireless LAN card, and communicates with another device (for example, the client 200, the storage 400, other BC server 300, and the like) via a network.

The memory 320 is, for example, a random access memory (RAM), and stores the BC program 600 for the BC node 300 to provide the BC service to the client 200, the operational agent 321, an operational processing program 323, and the like. The memory 320 is used as a storage area for storing various kinds of information read from a storage device 330 and as a work memory of the processor 310.

The storage device 330 is, for example, a hard disk drive (HDD) or a solid state drive (SSD), and stores various programs and data such as management information. Programs such as the BC program 600, the operational agent 321, and the operational processing program 323 may be stored in the storage device 330, and the programs may be read out from the storage device 330 to the memory 320 when the programs are executed by the processor 310.

The storage device 330 also stores a database 332, a distributed ledger 700, and BC management information 331 as various kinds of data managed by the BC service. The database 332 holds a latest state obtained as a result of the execution of the transaction received by the BC service. The database 332 includes a smart contract management table 800, the system configuration management table 900, the peripheral component management table 1000, an operational processing step management table 1100, an operational processing step transition management table 1200, an operational transaction management table 1300, and the operational log table 1400, which will be described below.

The distributed ledger 700 is data in which a log of the transaction received by the BC service is stored in a structure that is difficult to be falsified. The distributed ledger 700 includes a business (business processing) distributed ledger (a first distributed ledger) and an operational (operational processing) distributed ledger (a second distributed ledger).

The BC management information 331 is management information of the BC service, and manages a sharing range among a registered SC, each database 332, and the BC node 300 of the distributed ledger 700, authentication information of a user, access right, and the like. The database 332, the distributed ledger 700, and the BC management information 331 may be stored in the storage device 330, and may be rolled into the memory 320 as necessary when referenced by the BC program 600.

Next, a program executed by the BC node 300 will be described.

The BC program 600 includes an SC program 610, receives a transaction that is transaction data from the client 200, forms an agreement with other BC nodes 300 participating in the BC system 100 relating to the receipt of the transaction, executes a smart contract (SC) specified by the specification, commits a result of the transaction to the database 332 and registers a log of the transaction to the distributed ledger 700, and notifies the client 200 of the transaction processing result.

In the SC program 610, the operation of each SC is described. The BC program 600 selects and executes an appropriate program from among the plurality of SC programs 610 from SC specification of the transaction, and updates a value of the database 332 based on a result thereof.

The SC program 610 includes two types of a business SC program 611 which is an SC program for business, and an operational SC program 612 which is an SC program for operation. The business SC program 611 is the SC program 610 specified by the transaction from a business application in the client 200. The operational SC program 612 is the SC program 610 specified by the transaction from an operational management application in the client 200.

The operational agent 321 receives an execution notification from the operational SC program 612, and selects and executes the operational processing program 323 based on a notification content. The operational agent 321 registers an operational log indicating an execution status of the operational processing in the BC service at any time. The execution notification of the operational processing other than the operational SC program 612 may be allowed to the operational agent 321. For example, the management terminal 500 of the organization 110-1 may issue the execution notification of the operational processing performed only in the organization 110-1. In this case, the operational log of the operational processing unique to each organization 110 is registered as a trail in the BC service. The operational agent 321 holds a secret key 322 and assigns a signature by the secret key 322 to the operational log.

The operational processing program 323 describes contents of the operational processing executed by the operational agent 321. The operational processing program 323 may include, for example, a backup program that backs up data in the storage device 330 in cooperation with the storage 400, a backup data deletion program that deletes a backup data 431 of a storage device 430 of the storage 400, a restore program that restores data stored in the storage 400, and a deletion program that deletes data such as personal information from the backup data 431 of the storage 400.

Storage 400

The storage 400 stores the backup data 431 of the BC node 300. The storage 400 includes a processor 410, a memory 420, the storage device 430, and a network interface 440. These components 410, 420, 430, and 440 are interconnected via a bus 450.

The processor 410 is a calculation device including a CPU and the like, and controls the storage 400 in accordance with programs and calculation parameters that are stored in the memory 420.

The memory 420 is, for example, a Random Access Memory (RAM), and stores a backup program 421, a restore program 422, and a data deletion program 423 that operate in cooperation with the operational processing program 323 of the BC node 300. The memory 420 is used as an area for storing various kinds of information read from the storage device 430 and as a work memory of the processor 410.

The memory 420 also stores a log providing program 424. The log providing program 424 outputs a log at a time of execution of the processing of backup, restoration, and data deletion, and provides the log to the BC node 300. The log providing program 424 includes a secret key 425, and uses the secret key 425 to assign a signature to the log.

The storage device 430 is, for example, a hard disk drive (HDD) or a solid state drive (SSD), and stores data such as various programs, management information, and the backup data 431. The backup program 421, the restore program 422, and the data deletion program 423 may be stored in the storage device 430, and the programs may be read out from the storage device 430 to the memory 420 when the processor 410 executes the programs.

Distributed Ledger 700

Figure 4:
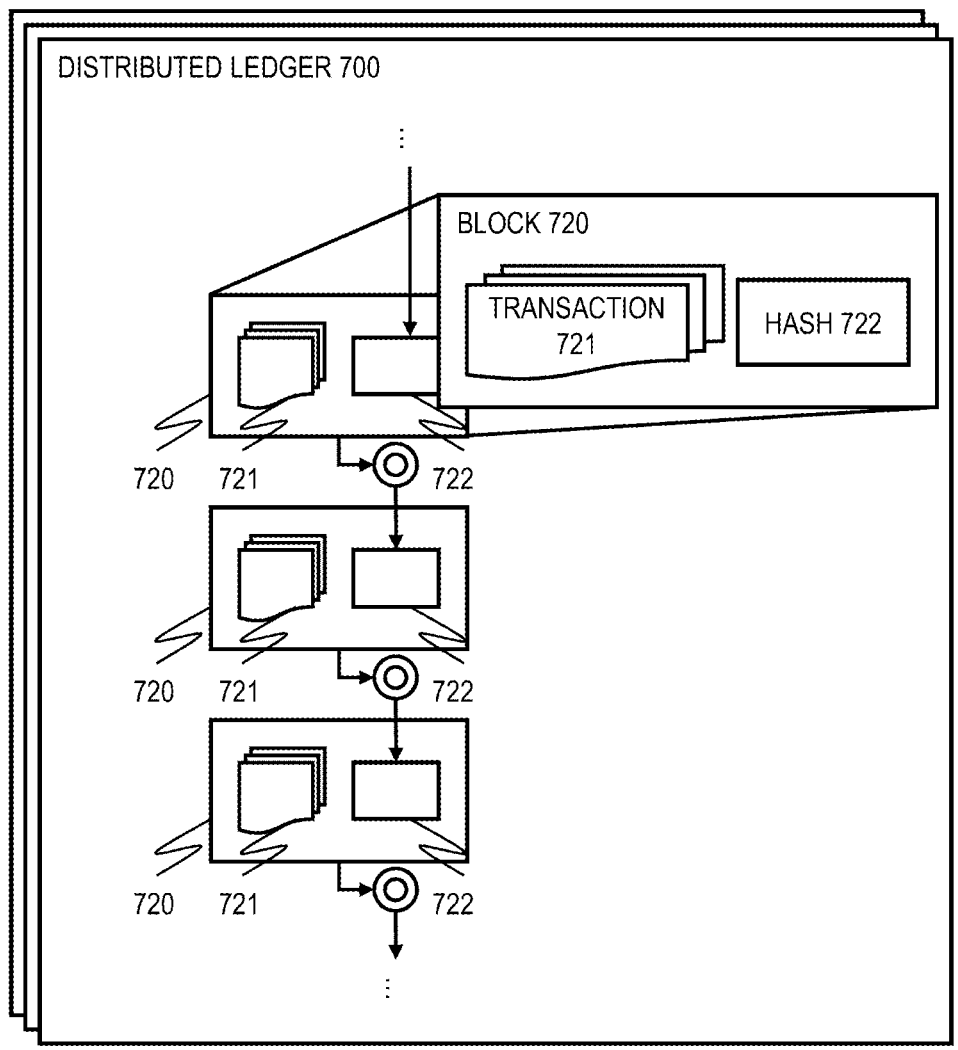
FIG. 4 shows a first configuration example of a distributed ledger according to the embodiment.

FIG. 4 shows a first configuration example of a distributed ledger according to the embodiment.

The distributed ledger 700 manages log data of the transaction of the BC service with a data structure that makes it difficult to falsify the log data. The distributed ledger 700 has a chain data structure in which a plurality of blocks 720 including the log data are connected. The block 720 includes one or more transactions 721 and a hash 722 calculated from the block 720 previously (just before) generated in the same distributed ledger 700. The hash 722 is a fixed length value calculated by a hash function. The hash function has a characteristic that it is difficult to estimate an input value from a hash that is an output, and it is difficult to obtain a different input value that obtains the same output value due to collision resistance.

The blocks 720 have a dependency relationship by the hash 722, and if the transaction 721 of one block 720 in the distributed ledger 700 is falsified, the hash 722 calculated from the block 720 does not match the hash 722 of the next block 720, and inconsistency occurs. Due to the characteristics of the hash function, it is difficult to generate falsified data to obtain the same hash 722, and changes to the information in the block 720 require changes to all subsequent blocks 720 in the same distributed ledger 700, so that falsification is difficult.

For example, in a case where the personal information in the transaction 721 may be deleted from the block 720, if the distributed ledger 700 has the data structure shown in FIG. 4, it is difficult to prevent data inconsistency. Therefore, in a case where the personal information in the transaction 721 may be deleted from the block 720, the distributed ledger 700 may be, for example, a data structure as shown in FIG. 5.

Figure 5:
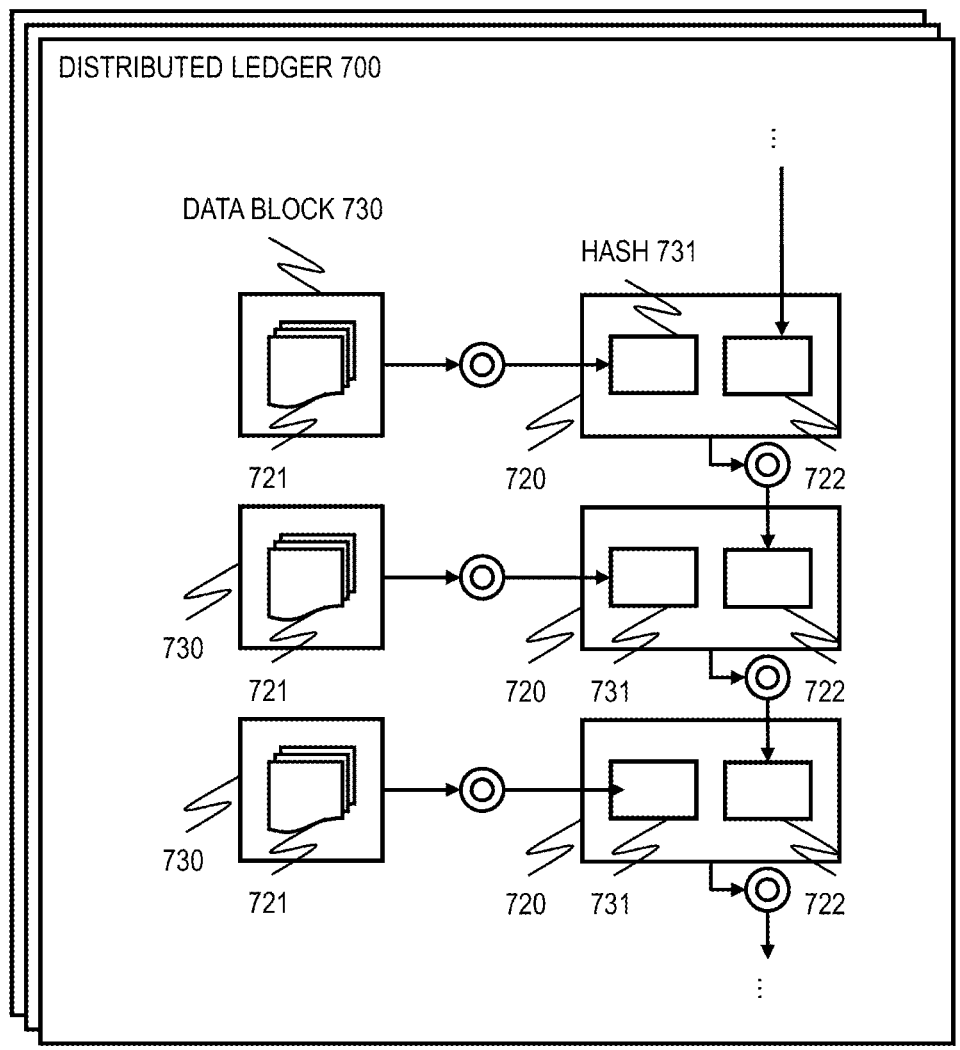
FIG. 5 shows a second configuration example of the distributed ledger according to the embodiment.

FIG. 5 shows a second configuration example of the distributed ledger according to the embodiment.

In the distributed ledger 700 shown in FIG. 5, a hash 731 calculated from a data block 730 including one or more transactions 721 is stored without directly storing the transaction 721 in the block 720 having a dependency relationship. Then, at the block 720, the hash 731 and the hash 722 calculated from the immediately preceding block 720 are stored. In the distributed ledger 700, by deleting the data block 730 at a time of data deletion and managing that the data block 730 corresponding to the hash 731 in the block 720 has been deleted by a flag, data can be deleted without causing inconsistency in the distributed ledger 700. Meanwhile, when the data block 730 is falsified, the hash 721 calculated from the data block 730 does not match the hash 731 in the corresponding block 720, and falsification detection is possible.

A data structure of the distributed ledger 700 is not limited to the examples of FIGS. 4 and 5, and may be, for example, a data structure that causes inconsistency when falsification occurs with respect to the transaction 721. For example, in the distributed ledger 700 in FIG. 4, instead of each transaction 721, a data structure in which a hash value calculated from each transaction 721 is stored in the block 720 may be used.

Database 332

Next, a configuration example of various tables included in the database 332 according to the present embodiment will be described.

Smart Contract Management Table 800

Figure 6:
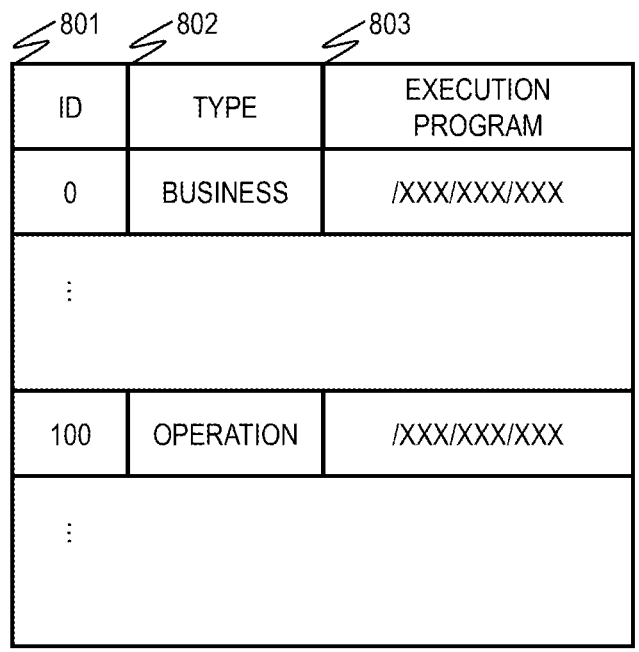
FIG. 6 is a configuration diagram of a smart contract management table according to the embodiment.

FIG. 6 is a configuration diagram of a smart contract management table according to the embodiment.

The smart contract management table 800 manages SCs registered in the BC service, and has an entry for each SC. The entry of the smart contract management table 800 includes items of an ID 801, a type 802, and an execution program 803.

The ID 801 stores an identifier of the SC corresponding to the entry. The identifier of the SC may be a numerical value, or may be a character string such as "backup_sc" or "restore_sc". The type 802 stores types of the SC corresponding to the entry. The types include, for example, a business SC used by the business application and an operational SC used by the operational management application. The execution program 803 stores information for specifying a program in which contents of the SC corresponding to the entry are described. The information for specifying the program includes, for example, a storage path of a program used when the SC corresponding to the entry is executed.

System Configuration Management Table 900

FIG. 7 is a configuration diagram of a system configuration management table according to the embodiment.

The system configuration management table 900 manages a configuration of the BC node 300 that executes the operational processing. The system configuration management table 900 stores an entry corresponding to the BC node 300 that implements the operational processing. The entry of the system configuration management table 900 includes items of an organization ID 901, a node ID 902, and a public key 903.

The organization ID 901 stores identifiers of the organization (organization IDs) that manage the BC node 300 corresponding to the entry. The node ID 902 stores identifiers (node IDs) of the BC node 300 corresponding to the entry. For example, the organization ID and the node ID may be represented by numerical values, or a character string such as "org 01" may be assigned as the organization ID and "svr 01" may be assigned as the node ID. A set of the organization ID and the node ID may be a single identifier such as "svr 01.org 01". In the present embodiment, the BC node 300 can be uniquely identified by values of the organization ID and the node ID. The public key 903 stores a public key corresponding to the secret key 322 held by the operational agent 321 in the BC node 300 corresponding to the entry. The public key is used to verify the signature assigned to the operational log of the operational processing by the operational agent 321.

Peripheral Component Management Table 1000

FIG. 8 is a configuration diagram of a peripheral component management table according to the embodiment.

The peripheral component management table 1000 manages peripheral components in cooperation with the BC node 300 in the operational processing. The peripheral component management table 1000 stores an entry for each peripheral component in cooperation with the BC node 300. The entry of the peripheral component management table 1000 includes items of an organization ID 1001, a component ID 1002, a type 1003, and a public key 1004.

The organization ID 1001 stores identifiers (organization IDs) of the organization that manages the peripheral component corresponding to the entry. The organization ID has a value common to the organization ID of the organization ID 901 of the system configuration management table 900. The component ID 1002 stores identifiers (component IDs) of the peripheral component corresponding to the entry. The organization ID and the component ID may be numerical values, or may be a single character string such as "storage 0.org 0" in which two IDs are combined. In the present embodiment, the peripheral component can be uniquely identified by values of the organization ID and the component ID. The type 1003 stores the type of the peripheral component corresponding to the entry. As the type, for example, there is a value such as "storage". The public key 1004 stores a public key corresponding to the secret key 425 held by the peripheral component corresponding to the entry. The public key is used to verify the signature assigned to the operational log of the operational processing by the peripheral component.

Operational Processing Step Management Table 1100

FIG. 9 is a configuration diagram of an operational processing step management table according to the embodiment.

The operational processing step management table 1100 manages steps (processing steps) of each operational processing to be implemented based on the operational SC. The operational processing step management table 1100 stores an entry for each step (processing step) included in the operational processing. The entry of the operational processing step management table 1100 includes the items of an SCID 1101, an organization ID 1102, a node ID 1103, a step ID 1104, an execution program 1105, a log registration necessity 1106, a log format 1107, a cooperation destination ID 1108, a cooperation destination log acquisition 1109, and a signature issuer 1110.

The SCID 1101 stores an identifier (SCID) of the SC which triggers the execution of the processing step corresponding to the entry. The SCID of the SCID 1101 corresponds to an ID of the ID 801 of the smart contract management table 800. The organization ID 1102 stores an organization ID to which the BC node 300 that executes the processing step corresponding to the entry belongs. The node ID 1103 stores the node ID of the BC node 300 that executes the processing step corresponding to the entry. Values of the organization ID 1102 and the node ID 1103 correspond to the values of the organization ID 901 and the node ID 902 of the system configuration management table 900. For example, an entry in which the organization ID 1102 is 1 and the node ID 1103 is 1 indicates a processing step executed by the BC node 300 corresponding to an entry in which the organization ID 901 is 1 and the node ID 902 is 1 in the system configuration management table 900. An entry in which the value of the organization ID 1102 and the node ID 1103 is not specified may describe default processing in which the BC node 300 that executes the processing may be any BC node 300. The step ID 1104 stores identifiers (processing step IDs) of the processing step corresponding to the entry. The processing step corresponding to the entry in the operational processing step management table 1100 is uniquely identified by the values of the SC ID 1101, the organization ID 1102, the node ID 1103, and the step ID 1104.

The execution program 1105 stores processing contents to be executed in the processing step corresponding to the entry. The processing contents may include, for example, a command executed in the processing step corresponding to the entry, and an argument thereof. The log registration necessity 1106 stores whether or not a log is to be registered in the BC service after the implementation of the processing step corresponding to the entry (log registration necessity). The log format 1107 stores an output format of the operational log output in the processing step corresponding to the entry. For example, the output format may be a description made by a format specifier. The cooperation destination ID 1108 stores identifiers (component IDs) of a peripheral component in cooperation with the processing step corresponding to the entry. The component ID corresponds to a value of the component ID 1002 in the peripheral component management table 1000. The cooperation destination log acquisition 1109 stores information indicating whether or not the peripheral component issues an operational log to be registered in the BC service. The signature issuer 1110 stores an issuer of a signature to be assigned to the operational log. For example, as the issuer, the BC node 300 and a cooperation destination may be specified or may be blank. Here, the blank indicates that no signature is assigned.

Operational Processing Step Transition Management Table 1200

FIG. 10 is a configuration diagram of an operational processing step transition management table according to the embodiment.

The operational processing step transition management table 1200 manages information relating to transition conditions between processing steps. The operational processing step transition management table 1200 includes an entry corresponding to a transition (transition between processing steps) from a processing step to another processing step. The entry of the operational processing step transition management table 1200 includes items of a SCID 1201, an organization ID 1202, a node ID 1203, a step ID 1204, a transition condition 1205, a next step ID 1206, and a registration state 1207.

The SCID 1201 stores an identifier (SCID) of the SC which triggers the execution of the processing step corresponding to the entry. A value of the SCID 1201 corresponds to the value of ID 801 of the smart contract management table 800. The organization ID 1202 stores an organization ID to which the BC node that executes the processing step corresponding to the entry belongs. The node ID 1203 stores the node ID of the BC node that executes the processing step corresponding to the entry. Values of the organization ID 1202 and the node ID 1203 correspond to the values of the organization ID 901 and the node ID 902 in the system configuration management table 900. The step ID 1204 stores identifiers (processing step IDs) of the processing step corresponding to the entry. By referring to an entry having a value set of the SCID 1101, the organization ID 1102, the node ID 1103, and the step ID 1104 in the operational processing step management table 1100 corresponding to a value set of the SCID 1201, the organization ID 1202, the node ID 1203, and the step ID 1204, a transition source processing step of the transition between steps corresponding to the entry in the operational processing step transition management table 1200 can be specified.

The transition condition 1205 stores a transition condition of the processing step corresponding to the entry. Each entry in the operational processing step transition management table 1200 is identified by the values of the SDID 1201, the organization ID 1202, the node ID 1203, the step ID 1204, and the transition condition 1205. The next step ID 1206 stores an identifier of the transition destination processing step in the transition between the steps corresponding to the entry. A value of the next step ID 1206 corresponds to the step ID 1104 in the operational processing step management table 1100, and the transition destination processing step in the transition between the processing steps corresponding to the entry can be specified. The registration state 1207 stores an execution state of the operational processing to be registered in the BC service when the transition condition corresponding to the entry is satisfied. The execution state includes, for example, during execution, abnormal termination, execution completion, and the like.

Operational Transaction Management Table 1300

FIG. 11 is a configuration diagram of an operational transaction management table according to the embodiment.

The operational transaction management table 1300 manages information of a transaction that has issued an operational processing execution request. The operational transaction management table 1300 stores an entry for each transaction that has issued an operational processing execution request. The entry of the operational transaction management table 1300 includes items of an ID 1301, a SCID 1302, a state 1303, a parameter 1304, an issuer 1305, a registration time stamp 1306, and a final update time stamp 1307.

The ID 1301 stores an identifier of a transaction that has issued an operational processing execution request corresponding to an entry. The SCID 1302 stores an identifier (SCID) of an SC specified by the transaction that has issued the operational processing execution request corresponding to the entry. The SCID of the SCID 1302 corresponds to the value of ID 801 of the smart contract management table 800. The state 1303 stores an execution state of the operational processing requested by the transaction corresponding to the entry. The execution state includes "execution start", "execution terminated", and the like. The parameter 1304 stores parameters specified by the transaction corresponding to the entry. The parameters include, for example, information such as backup target data. The issuer 1305 stores a user who issues the transaction corresponding to the entry. The registration time stamp 1306 stores a time stamp at a time of receiving the transaction corresponding to the entry. The final update time stamp 1307 stores a time stamp at a time of final updating the execution state of the operational processing requested by the transaction corresponding to the entry.

Operational Log Table 1400

FIG. 12 is a configuration diagram of an operational log table according to the embodiment.

An operational log table 1400 manages an operational log (an example of content information) of operational processing registered by the operational agent 321 of each BC node 300. The operational log table 1400 stores an entry corresponding to the operational log in each processing step of the operational processing registered by the operational agent 321. The entry of the operational log table 1400 includes items of a transaction (Tx) ID 1401, an organization ID 1402, a node ID 1403, a state 1404, a time stamp 1405, a completion step ID 1406, a log 1407, a signature 1408, and a next step ID 1409.

The Tx ID 1401 stores an identifier of a transaction requesting operational processing of an operational log corresponding to the entry. A transaction ID of the TxID 1401 corresponds to the value of the ID 1301 of the operational transaction management table 1300. The organization ID 1402 stores an organization ID to which the BC node that executes the processing step of the operational log corresponding to the entry belongs. The node ID 1403 stores the node ID of the BC node that executes the processing step of the log corresponding to the entry. Values of the organization ID 1402 and the node ID 1403 correspond to the values of the organization ID 901 and the node ID 902 in the system configuration management table 900.

The state 1404 stores an execution state of the operational processing requested for the transaction at a time of registration of the operational log corresponding to the entry. The execution state of the state 1404 corresponds to the value of the registration state 1207 in the operational processing step transition management table 1200. The time stamp 1405 stores a time stamp at the time of registration of the operational log corresponding to the entry. The completion step ID 1406 stores an identifier of the processing step in which the operational log corresponding to the entry is output. The processing step ID of the completion step ID 1406 corresponds to the value of the step ID 1104 in the operational processing step management table 1100. The log 1407 stores the operational log registered by the operational agent 321 corresponding to the entry. The signature 1408 stores an electronic signature assigned to the operational log corresponding to the entry. The next step ID 1409 stores an identifier of a processing step to be executed next to the processing step of the operational log corresponding to the entry. The processing step ID of the next step ID 1409 corresponds to the value of the step ID 1104 in the operational processing step management table 1100.

Next, processing in the BC system 100 according to the present embodiment will be described.

Figure 13:
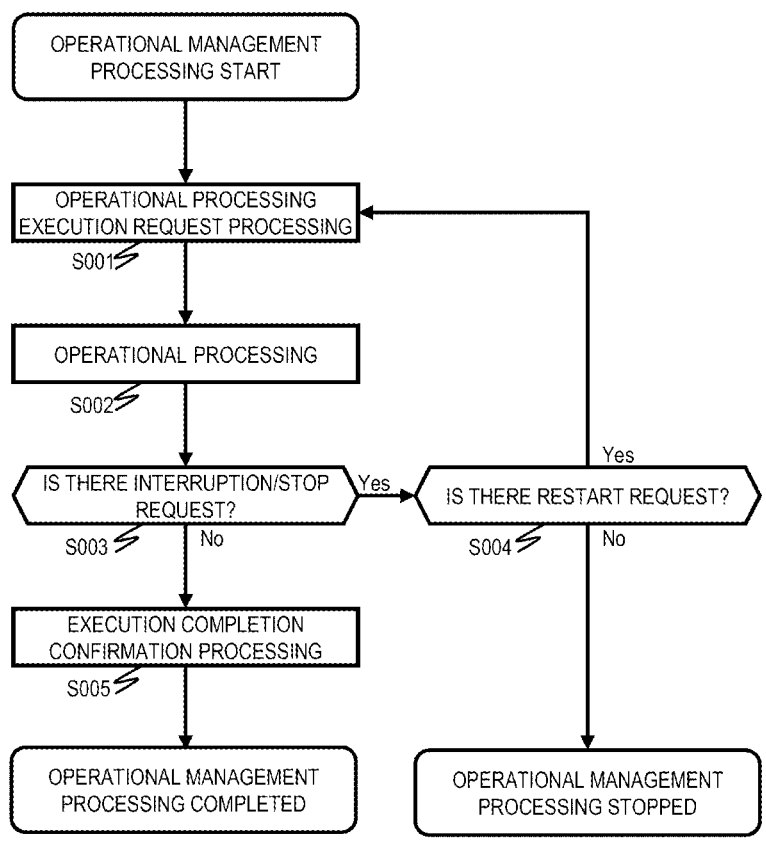
FIG. 13 is a flowchart of operational management processing according to the embodiment.

FIG. 13 is a flowchart of operational management processing according to the embodiment.

The operational management processing is roughly divided into three steps, namely, a step of performing an operational processing execution request (step S001), a step of executing the operational processing (step S002), and a step of performing execution completion confirmation of the operational processing (step S005).

The client 200 or the management terminal 500 performs an execution request processing of operational processing for the business distributed ledger 700 to each BC node 300 via the BC program 600 (step S001). The operational processing execution request is an example of a transaction execution request. Then, due to the operational processing execution request, the operational agent 321 of each BC node 300 that receives a notification executes the operational processing (step S002).

Next, the operational agent 321 determines whether or not a request for interruption or stop of the processing has occurred (step S003). When no request for interruption or stop occurs (step S003: No), the processing is moved to step S005.

On the other hand, when the request for the interruption or the stop occurs (step S003: Yes), the operational agent 321 determines whether or not there is a restart request (step S004). When there is a restart request (step S004: Yes), the processing is moved to step S001. On the other hand, when there is no restart request (step S004: No), the operational management processing is stopped.

In step S005, the operational agent 321 performs confirmation processing of execution completion of the operational management processing (operational processing execution completion confirmation processing), and the processing is terminated. In the operational processing execution completion confirmation processing, the operational agent 321 confirms that the operational processing has been completed in the entire BC system 100 based on the execution status of the operational processing in each BC node 300.

Transaction Processing

Before each processing of the operational management processing shown in FIG. 13 is described, transaction processing in the BC system 100 will be described.

Figure 14:
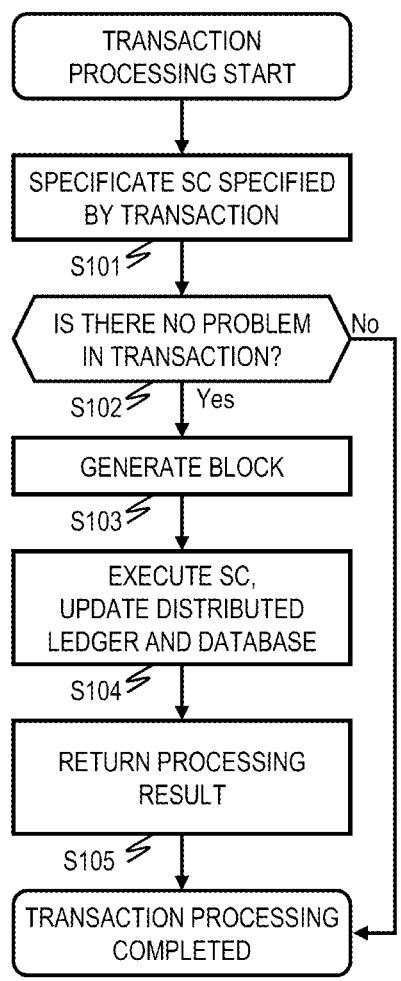
FIG. 14 is a flowchart of transaction processing according to the embodiment.

FIG. 14 is a flowchart of transaction processing according to the embodiment.

The transaction processing is executed by the BC program 600 of the BC node 300 in the BC system 100. The transaction processing may be implemented by all the BC nodes 300 in the BC system 100, or may be implemented by a part of the BC nodes 300 and distribute implemented processing results to other BC nodes 300.

The transaction processing is started when the BC program 600 of the BC node 300 receives a transaction issued from the client 200 or the management terminal 500. Here, the transaction includes, for example, an identifier for specifying the SC to be executed, an argument specified at a time of SC execution, a signature for user authentication.

First, the BC program 600 specifies an SC program specified by the transaction (step S101). Specifically, the BC program 600 refers to the smart contract management table 800, acquires an entry in which a value matching the identifier of the SC included in the received transaction has been stored in the ID 801, and specifies the SC program that specifies the transaction from the entry.

Next, the BC program 600 verifies contents of the received transaction (step S102). Specifically, the BC program 600 performs, for example, verification of a signature included in the transaction, consistency confirmation between the transaction processing content and the database 332, and matching confirmation of the transaction processing result between the BC nodes 300. When there is no problem in the verification result (step S102: Yes), the BC program 600 moves the processing to step S103 in order to reflect the transaction in the distributed ledger 700 and the database 332. On the other hand, when there is a problem in the verification result (step S102: No), the transaction processing is completed without reflecting the result of the transaction.

In step S103, the BC program 600 generates a block 729 including the transaction received in step S101. When the number of received transactions is less than the number of transactions stored in the block 729, the transaction is stored in the memory, and the subsequent processing is not performed. In the generation of the block 729, the BC program 600 of the BC node 300 selects the transaction received in step S101, that is, a predetermined number (a number stored in the block 729) of the transaction 721 not incorporated in the block 720 of the distributed ledger 700, calculates the hash 722 corresponding to block 720 based on the block 720 at the end of the distributed ledger 700, and generates the block 720 that includes the predetermined number of transactions 721 and the hash 722.

Next, in step S104, the BC program 600 registers the generated block 720 in the distributed ledger 700 by executing the SC program 610, executes the transaction 721 included in the registered block 720, and reflects a result in the database 332. In this step, the consistency of the block 720 to be registered may be confirmed. The consistency may be confirmed, for example, by determining whether the hash 722 included in block 720 matches the hash 722 calculated from the block 720 at the end of the distributed ledger 700. When it is determined that there is no consistency, for example, since it is considered that a new block 720 is added to the distributed ledger 700 by another BC node 300, the BC block 600 moves the processing to step S103 without executing the SC program 610 and updating the distributed ledger 700 and the database 332, newly generates another block 720 including the received transaction, and executes the subsequent processing. A method of generating and verifying the block 720 implemented in step S103 and step S104 is different depending on an agreement forming algorithm adopted by the BC system 100. The agreement forming algorithm includes, for example, proof of work (PoW) and practical byzantine fault tolerance (PBFT).

When the execution of step S104 is terminated, the BC program 600 moves the processing to step S105.

In step S105, the BC program 600 returns the result of the completed processing to the client 200 or the management terminal 500 that issues the transaction, and the transaction processing is completed. A content to be returned is, for example, an identifier of the executed transaction or a value of the database 332 updated by execution of the transaction.

Operational Processing Execution Request Processing

Next, the operational processing execution request processing (S001 in FIG. 13) will be described. In the operational processing execution request processing, the BC program 600 that has received the notification of a start request (execution request: transaction) of the operational processing from the client 200 or the management terminal 500 transmits an operational processing execution request to each node 300. The BC program 600 that receives the transaction of the operational processing execution request processes the received transaction of the operational processing execution request by the transaction processing shown in FIG. 14. In the transaction processing in this case, in step S101, the BC program 600 selects the operational SC program 612 corresponding to the operational processing execution request, and in step S104, the operational SC program 612 executes the processing.

Figure 15:
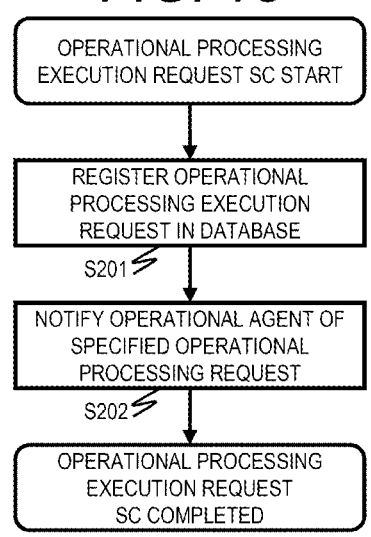
FIG. 15 is a flowchart of processing performed by an operational SC program corresponding to an operational processing execution request according to the embodiment.

FIG. 15 is a flowchart of processing performed by the operational SC program corresponding to the operational processing execution request according to the embodiment.

The operational SC program 612 corresponding to the operational processing execution request registers the transaction of the operational processing execution request in the operational transaction management table 1300 (step S201). Specifically, the operational SC program 612 sets information relating to the transaction, and newly registers the entry in which the state 1303 is set to an "execution request" in the operational transaction management table 1300. The ID 1301 of the entry in the operational transaction management table 1300 is a different value for each execution request of the operational processing. The ID 1301 may be a unique identifier in the distributed ledger 700 provided for each transaction by the BC program 600, and may be a unique value managed by the operational SC program 612.

Next, the operational SC program 612 notifies the operational agent 321 of a request (a processing request) of the operational processing (step S202). As a method of notifying the operational agent 321 of the processing request, for example, a signal may be transmitted to the operational agent 321, and a flag monitored by the operational agent 321 may be updated.

After the completion of the notification, the operational SC program 612 terminates the processing.

According to the processing performed by the operational SC program 612, the operational processing execution request is reflected on the entire BC node 300 via the BC program 600, and the execution request is notified to the operational agent 321 of each BC node 300.

Operational Processing Interruption Processing and Restart Request Processing

The operational processing interruption processing of performing the interruption request determined in step S003 and the restart request processing of performing the restart request determined in step S004 are also executed in the same flow as the operational processing request processing. In the operational processing interruption processing and the restart request processing, in step S201, the state 1303 of the entry of the transaction to be interrupted or restarted is updated to be interrupted or restarted, and in step S202, the operational agent 321 is notified of a request relating to the interruption or the restart of the operational processing.

Operational Processing

The operational processing in step S002 will be described. In the operational processing, the operational agent 321 of the BC node 300 in the BC system 100 selects and executes the operational processing program 323 corresponding to the notification content from the BC program 600.

Figure 16:
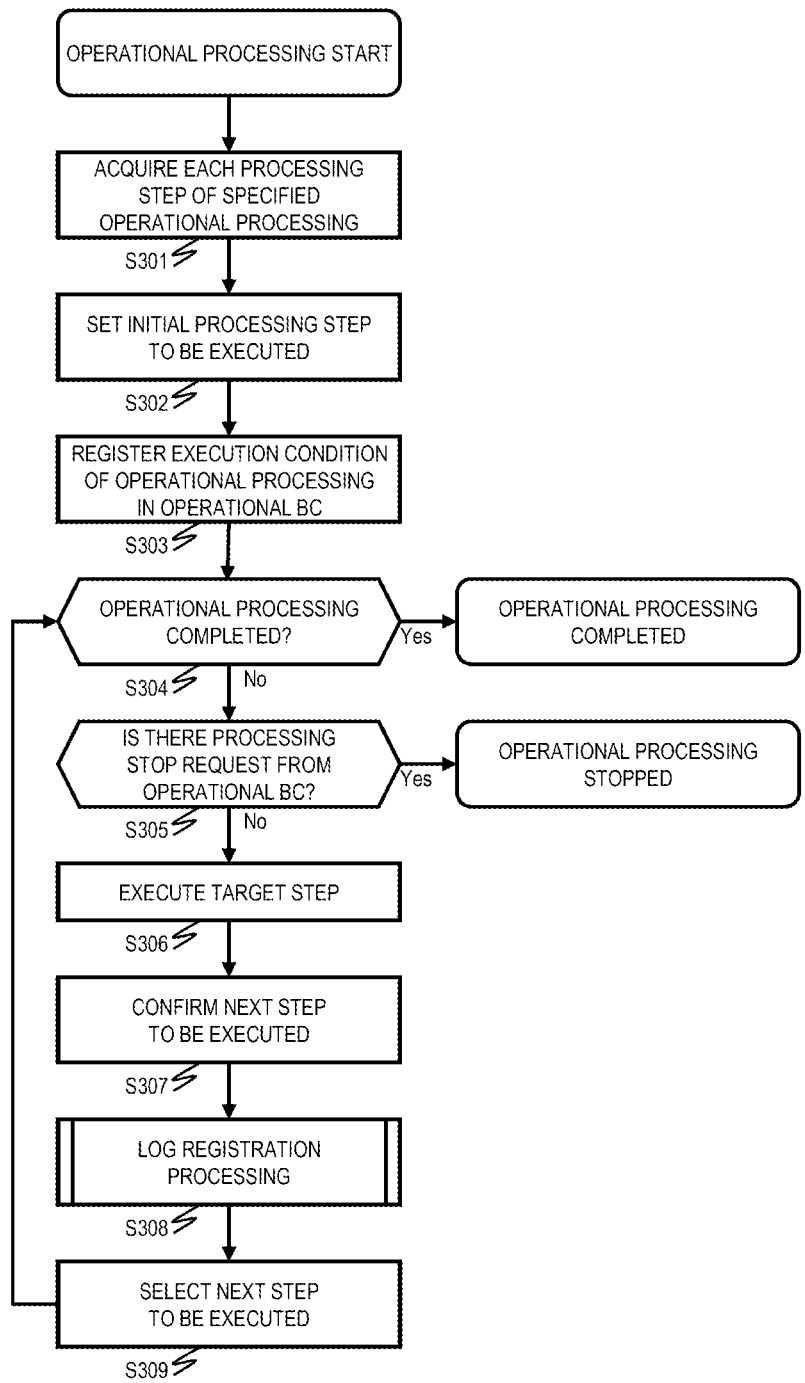
FIG. 16 is a flowchart of operational processing according to the embodiment.

FIG. 16 is a flowchart of the operational processing according to the embodiment.

The operational agent 321 starts to execute the operational processing when the operational processing request is notified from the BC program 600. Here, the notification of the operational processing request includes an identifier of the transaction that triggers the operational processing request or an identifier of the SC program that issues the notification, an argument necessary for the processing execution, and the like.

First, the operational agent 321 acquires information about processing steps relating to the operational processing being notified (step S301). For example, the operational agent 321 acquires, from the operational processing step management table 1100, an entry in which an identifier of the SC program 610 of a notification source matches a value of the SC ID and an identifier of the BC node 300 matches values of the organization ID 1102 and the node ID 1103. If there is no entry in which the identifier of the BC node 300 matches the value of the node ID 1103, an entry in which the node ID 1103 representing a default processing step is not specified is acquired.

The operational agent 321 acquires, from the operational processing step transition management table 1200, an entry in which the identifier of the SC program 610 of the notification source matches the ID of the SC ID 1201 and the identifier of the BC node 300 is included in the node ID 1203. In this case, if there is no entry in which the identifier of the BC node 300 matches the ID of the node ID 1203, an entry in which the node ID 1203 representing a transition condition between the default processing steps is not specified is acquired. By obtaining the information by the processing in step S301, the operational agent 321 can grasp each step (a processing step) of the operational processing notified by the operational SC program 612.

Next, the operational agent 321 sets an initial processing step to be executed in the notified operational processing (step S302). Specifically, the operational agent 321 selects an entry in which a value of the step ID 1104 is 1 representing an initial execution processing step among the entries acquired in step S301, and sets a processing step corresponding to the entry as a target processing step.

Next, the operational agent 321 notifies the BC program 600 of information of starting execution of the operational processing (step S303). Specifically, the operational agent 321 discloses, in an entry, the identifier of the transaction received by the operational processing execution request that triggers the execution of the operational processing or the identifier of the BC node 300, and the content of the operational processing transitioning to an execution start state, and issues the transaction for registering an entry in the operational log table 1400 to the BC program 600. However, at the start of the operational processing, the log 1407 or the signature 1408 in the entry may be registered as a blank. If there is no processing to be implemented in the BC node 300 based on the information relating to the processing step acquired in step S302, an execution completion state is registered in the state 1404. On the other hand, the BC program 600 that receives the transaction returns, as a response to the received transaction, success or failure of the entry registration and implementation availability of the subsequent operational processing based on the value of the state 1303 in the operational transaction management table 1300 indicating the execution state of the transaction that triggers the execution of the operational processing.

Next, the operational agent 321 determines whether or not the operational processing is terminated (step S304). As a result, if a value is acquired for the identifier of a next processing step acquired in step S301, a next processing step is present and the operational processing is not terminated (step S304: No). Therefore, the operational agent 321 moves the processing to step S305. On the other hand, if the value is not acquired, it means that a next processing step is not present and the operational processing is terminated (step S304: Yes), and thus the operational processing is completed.

In step S305, the operational agent 321 determines whether or not the processing steps subsequent to the operational processing during execution may be continuously executed. Specifically, the operational agent 321 grasps that the operational processing stop request is present and determines that the continuation of the operational processing is not executed when the notification of the processing execution interruption is received as a response from the BC program 600 to the transaction in step S303 or step S308 which will be described below, or when it is determined, by referring to the operational transaction management table 1300, that a value of the execution state 1303 of the transaction that triggers the operational processing is stopped. When the entry of the transaction that triggers the processing during execution in the operational transaction management table 1300 is not present, since the processing step is not considered to be a normally executed processing step, the operational agent 321 determines to stop the operational processing, that is, determine not to execute the continuation of the operational processing.

As a result, when the operational agent 321 determines to continue the operational processing (step S305: No), the operational agent 321 moves the processing to step S306. On the other hand, when the operational agent 321 determines to stop the operational processing (step S305: Yes), the operational processing is terminated.

In step S306, the operational agent 321 executes processing of the target processing step. Specifically, the operational agent 321 acquires a value of the execution program 1105 of the entry of the target processing step in the operational processing step management table 1100 as an execution command of the target processing step, and executes the execution command. When an argument is specified in the execution request of the operational processing, the operational agent 321 assigns the argument to the execution command according to the specification, and executes the processing of the target processing step.

Next, the operational agent 321 confirms a processing step to be executed next (step S307). Specifically, the operational agent 321 selects an entry in which the value of the step ID 1204 from the operational processing step transition management table 1200 acquired in step S301 matches the step ID of the target processing step. Then, the operational agent 321 selects an entry in which the value of the transition condition 1205 matches an execution result of the target processing step from the selected entries. The value of the next step ID 1206 of the selected entry is acquired as an identifier of the next processing step.

Next, the operational agent 321 executes log registration processing (see FIG. 17) of registering the operational log in the database 332 by issuing a log registration request at a time of executing the target processing step to the BC program 600 (step S308). By the log registration processing, a log (an operational log) of the operational processing result is registered in the database 332 and the distributed ledger 700.

Next, the operational agent 321 sets the next processing step as the target processing step, and moves the processing to step S304 (step S309). Specifically, the operational agent 321 selects, from the entries in the operational processing step management table 1100 acquired in step S301, an entry in which the value of the step ID 1104 matches the identifier of the next processing step acquired in step S307, and sets the processing step of the entry as the target processing step.

As described above, according to the operational processing, the operational processing is executed by the BC node 300 in the BC system 100, and the log of the operational processing result is registered in the database 332 and the distributed ledger 700. Accordingly, the administrator of each BC node 300 can easily and appropriately grasp the operational processing result from the BC node 300 to be managed.

Log Registration Processing

Next, the log registration processing (step S308 in FIG. 16) will be described.

FIG. 17 is a flowchart of the log registration processing according to the embodiment.

First, the operational agent 321 determines whether or not log registration in the target processing step is necessary (step S401). Specifically, the operational agent 321 determines a value of the log registration necessity 1106 of the entry corresponding to the target processing step in the operational processing step management table 1100. Here, if the log registration necessity 1106 is "necessary", it indicates that the log registration is necessary. If the log registration necessity 1106 is "unnecessary", it indicates that the log registration is not necessary.

As a result, when the log registration is necessary (step S401: Yes), the operational agent 321 moves the processing to step S403. On the other hand, if the log registration is not necessary (step S401: No), the processing is terminated.

In step S402, the operational agent 321 determines whether an acquisition destination of the log to be registered is the BC node 300 or a peripheral component (a peripheral machine). Here, when a value of the cooperation destination log acquisition 1109 of the entry of the target processing step in the operational processing step management table 1100 is "-", the operational agent 321 determines to acquire the log from the BC node 300. When the value of the cooperation destination log acquisition 1109 is "ON", the operational agent 321 determines to acquire the log from the peripheral component.

As a result, when the operational agent 321 determines to acquire the log from the BC node 300 (step S402: No), the operational agent 321 moves the processing to step S403. On the other hand, when the operational agent 321 determines to acquire the log from the peripheral component (step S402: Yes), the operational agent 321 moves the processing to step S404.

In step S403, the operational agent 321 acquires the log generated by the target processing step. In a log acquisition method by the operational agent 321, the log may be acquired from, for example, an output at a time of executing the command of the target processing step or may be acquired by referring to a log file generated by the command of the target processing step.

Next, the operational agent 321 determines whether or not a signature to the log to be registered is necessary (step S405). Specifically, if the issuer of the signature is set as the signature issuer 1110 of the entry of the target processing step of the operational processing step management table 1100, the operational agent 321 determines that the signature is necessary, and if the issuer of the signature is not set, the operational agent 321 determines that the signature is not necessary.

As a result, when the operational agent 321 determines that the signature is necessary (step S405: Yes), the operational agent 321 moves the processing to step S408. On the other hand, when the operational agent 321 determines that the signature is not necessary (step S405: No), the operational agent 321 moves the processing to step S410.

On the other hand, in step S404, the operational agent 321 acquires the log generated by the target processing step from the peripheral component (for example, the storage 400). In the log acquisition method by the operational agent 321, for example, the log may be acquired by issuing a command to the log providing program 424 of the storage 400, or a text output when the command is executed may be acquired as the log.

Next, the operational agent 321 determines whether or not a signature to the log to be registered is necessary (step S406). Specifically, if the issuer of the signature is set as the signature issuer 1110 of the entry corresponding to the target processing step in the operational processing step management table 1100, the operational agent 321 determines that the signature is necessary, and if the issuer of the signature is not set, the operational agent 321 determines that the signature is not necessary.

As a result, when the operational agent 321 determines that the signature is necessary (step S406: Yes), the operational agent 321 moves the processing to step S407. On the other hand, when the operational agent 321 determines that the signature is not necessary (step S406: No), the operational agent 321 moves the processing to step S410.

In step S407, the operational agent 321 determines whether the signature to the log is generated by the BC node 300 or the peripheral component. Specifically, the operational agent 321 determines a value of the signature issuer 1110 of the entry of the target processing step of the operational processing step management table 1100. When the value of the signature issuer 1110 is the BC node (step S407: No), the operational agent 321 determines that the BC node 300 generates the signature, and moves the processing to step S408. On the other hand, when the value of the signature issuer 1110 is the cooperation destination (step S407: Yes), the operational agent 321 determines that the peripheral component generates the signature, and moves the processing to step S409.

In step S408, the operational agent 321 generates a signature for the log to be registered. Specifically, the operational agent 321 creates a signature for the log to be registered using the held secret key 322.

In step S409, the operational agent 321 acquires the signature from the peripheral component. Specifically, the operational agent 321 requests the log providing program 424 of the storage 400 to generate the signature by, for example, a method of issuing a command. As a result, the log providing program 424 generates the signature for the log at the time of execution of the target processing step using the held secret key 425, and returns the signature to the operational agent 321. The operational agent 321 receives the generated signature from the storage 400. Accordingly, if the signature is generated by the peripheral component, unauthorized modification of the operational log on the BC node 300 side can be properly detected.

In step S410, an entry registered in the database 332 by the operational agent 321 is created. Specifically, the operational agent 321 creates an entry for a table including the log acquired in step S403 or step S404, the signature acquired in step S408 or step S409 (when the step has been implemented), and the value necessary for the entry of the operational log table 1400. For example, the step ID of the next step ID 1206 acquired in step S309 and the state of the registration state 1207 are set to the next step ID 1409 and the state 1404 in the entry.

Next, the operational agent 321 registers the operational log in the database 332 (the operational log table 1400) and the distributed ledger 700 (step S411). Specifically, the operational agent 321 generates a transaction for registering the entry created in step S410 in the database 332 and the distributed ledger 700, and transmits the generated transaction to the BC program 600. As a result, the BC program 600 registers the operational log in the database 332 and the distributed ledger 700, and returns a completion notification for the transaction to the operational agent.

Thereafter, when the completion notification for the transaction from the BC program 600 is received, the operational agent 321 completes the log registration processing.

According to the log registration processing, the operational log is stored in the database 332 of each BC node 300 in the BC system 100 and the distributed ledger 700. Accordingly, the administrator of each BC node 300 can easily and appropriately grasp the operational log from the BC node 300 to be managed. When the signature is assigned to the operational log, it is possible to appropriately grasp whether the operational log is not falsified by the signature.

Operational Processing Execution Completion Confirmation Processing

Next, the operational processing execution completion confirmation processing (S005 in FIG. 13) will be described. In the operational processing execution completion confirmation processing, the BC program 600 confirms execution completion of the operational processing in each BC node 300. Specifically, the BC program 600 that has received the notification of an execution completion confirmation request (an operational processing execution confirmation request: transaction) of the operational processing from the client 200 or the management terminal 500 transmits the operational processing execution completion confirmation request to each node 300. The transaction of the operational processing execution completion confirmation request includes information such as an identifier of a transaction of operational processing execution request processing desired to confirm execution completion. The BC program 600 that receives the transaction of the execution completion confirmation request processes the received transaction of the operational processing execution completion confirmation request by the transaction processing shown in FIG. 14. In the transaction processing in this case, in step S101, the BC program 600 selects the operational SC program 612 corresponding to the operational processing execution completion confirmation request, and in step S104, the operational SC program 612 executes the processing.

FIG. 18 is a flowchart of processing performed by the operational SC program corresponding to the operational processing execution completion confirmation request according to the embodiment.

The operational SC program 612 corresponding to the operational processing execution completion confirmation request acquires information of the BC node 300 in the BC system 100 and information of the transaction to be completion-confirmed (step S501). Specifically, the operational SC program 612 generates a list of the BC nodes 300 that participate in the BC system 100 with reference to the system configuration management table 900. In addition, the operational SC program 612 acquires an entry in which the value of the ID 1301 from the operational transaction management table 1300 matches the identifier of the transaction specified as a completion confirmation target in the transaction of the operational processing execution completion confirmation request.

Next, the operational SC program 612 selects one BC node 300 (a target BC node) for which the operational log is to be confirmed (step S502). Specifically, the operational SC program 612 selects, from the list of the BC nodes 300 generated in step S501, one BC node 300 that does not confirm the log in the transaction being processed as the target BC node.

Next, the operational SC program 612 determines the completion of the operational processing in the BC node (step S503). When the execution is completed (step S503: Yes), the processing is moved to step S505, and when the execution is not completed (step S503: No), the processing is moved to step S504. Specifically, the operational program 612 acquires, from the operational log table 1400, an entry in which the identifier of the transaction for which the execution completion is to be determined matches the value of the TxID 1401 and the target BC node matches the value of the organization ID 1402 and the value of the node ID 1403, selects a latest log entry from the entries based on the value of the time stamp 1405, and determines whether or not the execution is completed based on the value of state 1404 of the selected entry. In addition, the operational program 612 may interpret a value of the log 1407 of the operational log table 1400 based on the value of the log format 1107 in the operational processing step management table 1100 and determine correctness of contents of the operational log for the operational processing and the match of the log contents among the participating nodes, as operational processing completion.

In step S504, the operational SC program 612 sets an uncompleted flag of the operational processing. The uncompleted flag may be managed for each BC node 300, and one flag may be managed in the entire participating BC node 300. Thereafter, the operational SC program 612 moves the processing to step S503.

In step S505, the operational SC program 612 sets a target processing log for signature confirmation. Specifically, the operational SC program 612 selects an entry whose signature is not verified from the entry acquired from the operational log table 1400 in step S503, and sets the entry as the target processing log.

Next, the operational SC program 612 determines whether or not signature confirmation of the log is necessary (step S506). Specifically, the operational SC program 612 acquires, from the operational processing step management table 1100, an entry as information of the target processing step. In the entry, the SCID of the transaction whose completion is to be confirmed acquired in step S501 matches the value of the SCID 1100, the identifier of the BC node 300 matches the value of the organization ID 1102 and the value of the node ID 1103, and the value of the completion step ID 1406 of the entry of the target log acquired in step S505 matches the value of the step ID 1104. Next, the operational SC program 612 determines whether or not the signature confirmation is necessary based on the value of the signature issuer 1110 from the acquired entry.

As a result, when the signature confirmation is necessary (step S506: Yes), the operational SC program 612 moves the processing to step S507. On the other hand, when the signature confirmation is not necessary (step S506: No), the operational SC program 612 moves the processing to step S513.

In step S507, the operational SC program 612 determines whether the signature issuer of the target log is the BC node 300 or the cooperation destination. Specifically, the operational SC program 612 confirms a value of the signature issuer 1110 of the entry of the target processing step acquired in step S506, and determines whether the value is the BC node 300 or the peripheral component.

As a result, when the signature issuer is the BC node 300 (step S507: No), the operational SC program 612 moves the processing to step S508. On the other hand, when the signature issuer is the peripheral component (step S507: Yes), the operational SC program 612 moves the processing to step S509.

In step S508, the operational SC program 612 acquires a public key corresponding to a secret key of the target BC node 300 for verifying the signature. Specifically, the operational SC program 612 selects an entry having the value of the organization ID 901 and the value of the node ID 902 that correspond to the target BC node 300 from the system configuration management table 900, and acquires the public key set as the public key 903 of the selected entry. After the termination of step S508, the operational SC program 612 moves the processing to step S511.

In step S509, the operational SC program 612 specifies the peripheral component that has generated the signature. Specifically, the operational agent 612 acquires the identifier of the cooperation destination ID 1108 of the entry of the target processing step acquired from the operational processing step management table 1100 in step S507, thereby specifying the peripheral component that has generated the signature.

Next, the operational SC program 612 acquires the public key corresponding to the secret key of the peripheral component that generates the signature (step S510), and moves the processing to step S511. Specifically, the operational SC program 612 selects, from the peripheral component management table 1000, an entry in which the identifier of the organization to which the target BC node 300 belongs matches the value of the organization ID 1001 and the identifier of the peripheral component acquired in step S510 matches the value of the component ID 1002, and acquires the public key from the public key 1004 of the entry.

In step S511, the operational SC program 612 verifies the signature assigned to the target log. Specifically, the operational SC program 612 verifies the signature using the public key acquired in step S508 or step S510. A signature verification method depends on a signature generation method, and is, for example, a method of confirming that a value obtained by decrypting the signature with the public key matches a hash value of the log.

As a result, if the signature is correct (step S511: Yes), the operational SC program 612 moves the processing to step S513. On the other hand, if the signature is not correct (step S511: No), the operational SC program 612 moves the processing to step S512.

In step S512, the operational SC program 612 sets a falsification flag of the signature of the operational processing. The flag may be managed for each BC node 300, and one flag may be managed in the entire participating BC node 300. After step S512, the operational SC program 612 moves the processing to step S514.

In step S513, the operational SC program 612 determines whether or not verification of signatures of all logs is completed. Specifically, the operational SC program 612 sets each entry acquired from the operational log table 1400 in step S503 as the target processing step, and determines whether or not the signature verification processing is implemented. As a result, if all entries have been processed (step S513: Yes), the operational SC program 612 moves the processing to step S514. On the other hand, if there is an unprocessed entry (step S513: No), the operational SC program 612 moves the processing to step S503.

In step S514, the operational SC program 612 determines whether or not the processing for all BC nodes 300 is completed. Specifically, the operational SC program 612 sets the BC node corresponding to all entries of the list generated in step S501 as the target BC node, and determines whether or not the execution state of the operational processing is confirmed.

As a result, when the execution state of all BC nodes 300 has not been confirmed, that is, when there is an unconfirmed BC node 300 (step S514: No), the operational SC program 612 moves the processing to step S501. On the other hand, when the unconfirmed BC node 300 is not present (step S514: Yes), the operational SC program 612 moves the processing to step S515.

In step S515, the operational SC program 612 updates the database 332 by summarizing the execution status confirmation results of the operational processing. Specifically, the operational SC program 612 determines the execution status of the transaction based on the uncompleted flag and the falsification flag. For example, when the uncompleted flag or the falsification flag is set, the execution state of the transaction is during execution or uncompleted. Then, the operational SC program 612 updates the execution state 1303 of the entry of the transaction whose completion is to be determined acquired from the operational transaction management table 1300 in step S501 based on the determined execution status. Thereafter, the operational SC program 612 terminates the processing.

According to the processing described above, by checking the operational log at a time of execution of the operational processing in all the organizations 110 and verifying the signature assigned to the log, it is possible to determine whether the operational log is falsified and determine the execution status of the operational processing.

The invention is not limited to the above embodiment, and can be appropriately modified and implemented without departing from the spirit of the invention.

For example, in the above embodiment, the operational log is managed in both the database 323 (the operational log table 1400) and the operational distributed ledger 700. However, the invention is not limited thereto, and may be managed in at least one of the database 323 and the distributed ledger 700.

In the above embodiment, part or all of the processing performed by the processor may be performed by a hardware circuit. The program in the above embodiment may be installed from a program source. The program source may be a program distribution server or a storage medium (for example, a portable storage medium).

What is claimed is:

1. A distributed ledger device in a distributed ledger system including a plurality of distributed ledger devices that manage a first distributed ledger for a predetermined target transaction, the distributed ledger device comprising:
a storage device; and
a processor unit, wherein
the storage device stores the first distributed ledger and information relating to the first distributed ledger, including a peripheral component management table for managing a peripheral component that stores back up data, and
the processor unit, executes information deletion processing to delete from the storage device, information relating to the first distributed ledger;
when executing the information deletion processing of the information relating to the first distributed ledger, the processor generates an operational log indicating execution state of processing steps of the information deletion processing, and transmits the operational log indicating the execution state of the processing steps of the information deletion processing to be managed by another distributed ledger device that manages the first distributed ledger, and wherein:
the distributed ledger device is connected to a peripheral component that is identified in the peripheral component management table, and is to be involved in the information deletion processing of the information relating to the first distributed ledger, the peripheral component storing backup data of the operational log and a secret key, the processor unit:
uses the secret key to acquire a signature for the operational log from the peripheral component identified in the peripheral component management table,
uses the secret key to acquire the operational log from the peripheral component, and
transmits the operational log as signed with the acquired signature.

2. The distributed ledger device according to claim 1, wherein the processor unit transmits an instruction to register the operational log in a second distributed ledger managed by the plurality of distributed ledger devices that manage the first distributed ledger.

3. The distributed ledger device according to claim 1, wherein the processor unit transmits an instruction to register the operational log in a database in each storage device of the plurality of distributed ledger devices that that manage the first distributed ledger.

4. The distributed ledger device according to claim 1, wherein the processor unit transmits the operational log assigned with a signature using a secret key of the distributed ledger device.

5. The distributed ledger device according to claim 4, wherein the processor unit
acquires a public key corresponding to the secret key used for the signature assigned to the operational log, and determines whether the signature is correct using the public key, and
transmits an execution state of the information deletion processing corresponding to an execution request based on a determination result so as to be managed by the other distributed ledger device.

6. The distributed ledger device according to claim 1, wherein the processor unit
when receiving an execution request for information deletion processing for the information relating to the first distributed ledger, registers the execution request in a database and issues an information deletion processing request to execute the information deletion processing of the information relating to the first distributed ledger corresponding to the execution request,
when processing corresponding to the information deletion processing request is executed, determines whether the execution request that is a basis for the information deletion processing request is present in the database, and
prevents execution of the information deletion processing corresponding to the information deletion processing request when the execution request that is the basis of the information deletion processing request is not present in the database.

7. The distributed ledger device according to claim 1, wherein
the information deletion processing of the information relating to the first distributed ledger is processing of deleting backup data of the first distributed ledger.

8. A distributed ledger system comprising:
a plurality of distributed ledger devices that manage a first distributed ledger for a predetermined target transaction, wherein the distributed ledger device includes a storage device and a processor unit,
the storage device stores the first distributed ledger, backup data relating to the first distributed ledger, and a peripheral component management table that identifies a peripheral component that stores back up data of an operational log indicating execution state and processing steps of backup data deletion processing and a secret key; and
the processor unit, when executing backup data deletion processing relating to the first distributed ledger, uses the secret key to acquire a signature for the operational log from the peripheral component identified in the peripheral component management table,
uses the secret key to acquire the operational log from the peripheral component, and
transmits the operational log indicating the execution state and the processing steps of the backup data deletion processing to another distributed ledger device that manages the first distributed ledger.

9. A distributed ledger management method performed by a distributed ledger device in a distributed ledger system including a plurality of distributed ledger devices that manage a first distributed ledger for a predetermined target transaction, the distributed ledger management method comprising:
storing a peripheral component management table that identifies a peripheral component that stores back up data of a generated operational log and a secret key;
executing information deletion processing of information relating to the first distributed ledger stored in a storage device;
using the secret key to acquire a signature for the generated operational log from the peripheral component identified in the peripheral component management table,
using the secret key to acquire the operational log from the identified peripheral component,
and
transmitting the operational log indicating execution state and processing steps of the information deletion processing of the information relating to the first distributed ledger to another distributed ledger device that manages the first distributed ledger.

* * * * *